United States Patent
Yun et al.

(10) Patent No.: US 8,041,308 B2
(45) Date of Patent: Oct. 18, 2011

(54) METHOD OF TRANSMITTING CHANNEL QUALITY INFORMATION IN MOBILE COMMUNICATION SYSTEM

(75) Inventors: Young Woo Yun, Seoul (KR); Hak Seong Kim, Seoul (KR); Bong Hoe Kim, Gyeonggi-do (KR); Joon Kui Ahn, Seoul (KR); Dong Youn Seo, Seoul (KR); Jung Hoon Lee, Seoul (KR); Ki Jun Kim, Seoul (KR); Suk Hyon Yoon, Seoul (KR); Eun Sun Kim, Seoul (KR); Jong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 601 days.

(21) Appl. No.: 12/278,758

(22) PCT Filed: Feb. 8, 2007

(86) PCT No.: PCT/KR2007/000691
§ 371 (c)(1),
(2), (4) Date: Nov. 25, 2008

(87) PCT Pub. No.: WO2007/091858
PCT Pub. Date: Aug. 16, 2007

(65) Prior Publication Data
US 2009/0130986 A1    May 21, 2009

(30) Foreign Application Priority Data

Feb. 8, 2006 (KR) .................. 10-2006-0012203
Mar. 14, 2006 (KR) .................. 10-2006-0023669

(51) Int. Cl.
*H04B 1/00* (2006.01)

(52) U.S. Cl. ............... 455/69; 455/67.11; 370/332
(58) Field of Classification Search .............. 455/69, 455/67.11; 370/332
See application file for complete search history.

(56) References Cited

U.S. PATENT DOCUMENTS

| 7,245,598 | B2 * | 7/2007 | Puig-Oses et al. ............ 370/334 |
| 7,310,499 | B2 * | 12/2007 | Magnusson et al. ............ 455/69 |
| 7,457,588 | B2 * | 11/2008 | Love et al. ................. 455/67.11 |
| 7,545,763 | B2 * | 6/2009 | Wunder et al. ............... 370/319 |
| 7,675,894 | B2 * | 3/2010 | Wunder et al. ............... 370/343 |
| 7,688,798 | B2 * | 3/2010 | Dottling et al. .............. 370/345 |
| 2004/0022213 | A1 | 2/2004 | Choi et al. |
| 2005/0063336 | A1 | 3/2005 | Kim et al. |

FOREIGN PATENT DOCUMENTS

JP    2004522387    7/2004

(Continued)

*Primary Examiner* — Patricia Nguyen
(74) *Attorney, Agent, or Firm* — Lee, Hong, Degerman, Kang & Waimey

(57) ABSTRACT

A method of exchanging channel quality information between a base station and a user equipment in a mobile communication system is disclosed. A method of transmitting channel quality information in a mobile communication system which transmits channel quality information from a user equipment to a base station comprises transmitting channel quality information, which is measured based on a signal received from the base station, to the base station, receiving feedback information of the channel quality information from the base station, and transmitting difference information to the base station, the difference information for matching the channel quality information transmitted from the user equipment with channel quality information received by the base station based on the feedback information.

26 Claims, 5 Drawing Sheets

| | FOREIGN PATENT DOCUMENTS | | WO | 2005/060132 A1 | 6/2005 |
|----|----|----|----|----|----|
| JP | 2006109458 | 4/2006 | WO | 2005/072073 A1 | 8/2005 |
| JP | 2008524913 | 7/2008 | WO | 2007015305 | 2/2007 |
| JP | 2008538061 | 10/2008 | | | |

* cited by examiner

METHOD OF TRANSMITTING CHANNEL QUALITY INFORMATION IN MOBILE COMMUNICATION SYSTEM

TECHNICAL FIELD

The present invention relates to a mobile communication system, and more particularly, to a method of transmitting channel quality information in a mobile communication system.

BACKGROUND ART

In a mobile communication system, a user equipment (UE) measures quality of a downlink channel using signals received from a base station and transmits channel quality information to the base station. The base station performs downlink scheduling depending on channel quality information received from at least one or more user equipments. Examples of the channel quality information include a channel quality indicator (CQI), a signal to noise ratio (SNR), a carrier to interference and noise ratio (CINR), a bit error rate (BER), and a frame error rate (FER), etc. The channel quality information is transmitted to the base station through an uplink control channel. The downlink scheduling is to allow the base station to allocate limited radio resources such as codes, frequencies, and time to user equipments, and is based on channel quality information received from each of the user equipments.

FIG. 1 is a diagram illustrating a method of measuring and transmitting channel quality information in a mobile communication system. Referring to FIG. 1, a user equipment (UE) 12 measures channel quality by using signals transmitted on a downlink channel from a base station 11 (101). The user equipment 12 reports the measured value to the base station 11 (102). At this time, the measured channel quality may be transmitted using quantized CQI information, for example. Alternatively, the measured channel quality may be transmitted as a carrier to interference and noise ratio (CINR) value. The base station 11 performs scheduling such as user equipment selection and radio resource allocation by using the received CQI information.

Conventionally, 'CQI' means an indicator that indicates each rank when channel quality is quantized and subdivided for each rank. However; 'CQI' may herein be used to indicate general channel quality information which includes 'channel quality rank indicator.'

Related art associated with various methods for transmitting channel quality information depending on types of a mobile communication system are disclosed. One of them is a method which allows a user equipment to transmit a part of information such as differential information periodically or non-periodically without transmitting all of channel quality information, thereby reducing the amount of physical channel control information. This method is to allow the user equipment to transmit whole channel quality information if necessary. At this time, partial channel quality information may be transmitted to a physical control channel by a method such as differential modulation (DM).

According to the related art method for transmitting channel quality information, when a user equipment transmits channel quality information to a base station, there may be some risk in that the base station may receive incorrect channel quality information having error during transmission due to some factors such as an unexpected change of a channel status. If the base station receives incorrect channel quality information and performs downlink scheduling based on the incorrect channel quality information, limited radio resources cannot be distributed efficiently. This adversely affects throughput of the whole system.

Meanwhile, an orthogonal frequency division multiplexing (OFDM) system divides a data stream having a high data transmission rate into a plurality of data streams having a slow data transmission rate, and transmits the data streams using a plurality of carriers corresponding to the divided data streams. In other words, since the respective carriers which are referred to as sub-carriers have orthogonality to one another, a receiving party can independently detect the data streams transmitted through the respective carriers.

In a system which performs communication using a plurality of frequencies like the aforementioned OFDM system, if only one CQI corresponding to the whole band is reported, channel quality status of some frequency band (frequency band divided for acquisition of CQI) constituting the whole band cannot be predicted exactly. For this reason, scheduling using CQI cannot be performed for each frequency band constituting the whole band. As a result, a problem occurs in that communication cannot be performed efficiently.

DISCLOSURE OF THE INVENTION

Accordingly, the present invention is directed to a method of transmitting channel quality information in a mobile communication system, which substantially obviates one or more problems due to limitations and disadvantages of the related art.

An object of the present invention is to provide a method of transmitting channel quality information in a mobile communication system and a support method thereof, in which a receiving error is reduced to efficiently allocate radio resources, wherein the receiving error may occur in channel quality information used as basic information in allowing a base station to perform downlink scheduling.

Another object of the present invention is to provide a method of transmitting channel quality information in a mobile communication system, in which limited physical channel resources are efficiently used, and more exact CQI is reported, thereby performing efficient downlink scheduling.

To achieve the above objects, one feature of the present invention is characterized in that some or all of channel quality information received from a user equipment to a base station or the result of data processing with respect to the channel quality information is transmitted to the user equipment as feedback information, wherein the feedback information may be transmitted periodically, non-periodically, or if a predetermined event occurs.

Another feature of the present invention is characterized in that a user equipment compares feedback information received from a base station with channel quality information stored therein and transmits difference information to the base station, wherein the difference information is to match channel quality information transmitted from the user equipment to the base station with channel quality information received in the base station. The difference information can be transmitted if certain conditions are satisfied. The certain conditions and a parameter for determining as to whether the certain conditions are satisfied can be transmitted from the base station to the user equipment.

Other feature of the present invention is characterized in that a base station receives difference information transmitted from a user equipment, corrects channel quality information stored therein depending on the received difference information, and performs downlink scheduling using the corrected channel quality information.

In one aspect of the present invention, a method of transmitting channel quality information (CQI) in a system which transmits data by using multi-carriers, comprises transmitting CQI corresponding to a plurality of CQI bands constituting a whole frequency band, the CQI including first information having a size more than a certain size through medium access control (MAC) signaling, and transmitting CQI corresponding to the CQI bands, the CQI including second information having a size less than the certain size on a physical channel.

In another aspect of the present invention, a method of transmitting channel quality information from a user equipment to a base station in a mobile communication system, comprises transmitting channel quality information which is measured based on signals received from the base station, to the base station, receiving feedback information of the channel quality information from the base station, and transmitting difference information to the base station, the difference information being necessary for matching the channel quality information transmitted by the user equipment with channel quality information received by the base station based on the feedback information.

In other aspect of the present invention, a method of supporting transmission of channel quality information in a mobile communication system, comprises receiving channel quality information from the user equipment, the channel quality information being measured by a user equipment based on signals transmitted from a base station, and transmitting feedback information to the user equipment to compare the received channel quality information with channel quality information transmitted by the user equipment.

BEST MODE FOR CARRYING OUT THE INVENTION

Hereinafter, reference will now be made in detail to the preferred embodiments of the present invention, examples of which are illustrated in the accompanying drawings.

If a whole available band is used as a CQI measurement band and its average CQI value is reported like the related art, scheduling for each of frequency bands cannot be performed. Meanwhile, a method of reporting CQI using a physical channel is designed such that frequency area scheduling is not performed. Also, since physical channel resources are limited, it is difficult to transmit much control information. Meanwhile, if CQI is transmitted using medium access control (MAC) signaling, it is not easy to perform close operation with a physical channel, and time latency occurs, whereby it is difficult to adapt to channel change of a frequency area.

Accordingly, one feature of the present invention is to transmit a little information, which requires fast transmission, to a physical channel CQICH and transmit much CQI information, which is less susceptible to time than physical channel information, to MAC signaling.

To report CQI, the following schemes can be used. A CQICH channel which is a physical channel may be used for reporting CQI (for example, effective CINR). Alternatively, CQI (for example, effective CINR) may be reported using MAC signaling.

To measure downlink channel quality, a base station reports a downlink quality measurement region (time and/or frequency region) to a user equipment. The measurement region means pilot signals inserted into a corresponding data region, a preamble region transmitted to all of user equipments, or a resource region used for other purposes of use. The user equipment transmits a CINR measurement value with respect to a designated region to the base station.

Meanwhile, a band AMC operation mode can be defined to obtain a gain by performing frequency area scheduling. The band AMC operation mode divides a whole band into several AMC bands, selects a user equipment based on a radio channel status of each band, and allocates a resource. At this time, radio channel status information can be acquired from CQI transmitted from the user equipment. For example, the user equipment can measure radio channel quality with respect to a plurality of AMC bands and report several identifiers (ID) of the most excellent AMC band and a CINR value to the base station. This CQI report method is referred to as an AMC signaling method.

Figure 1:
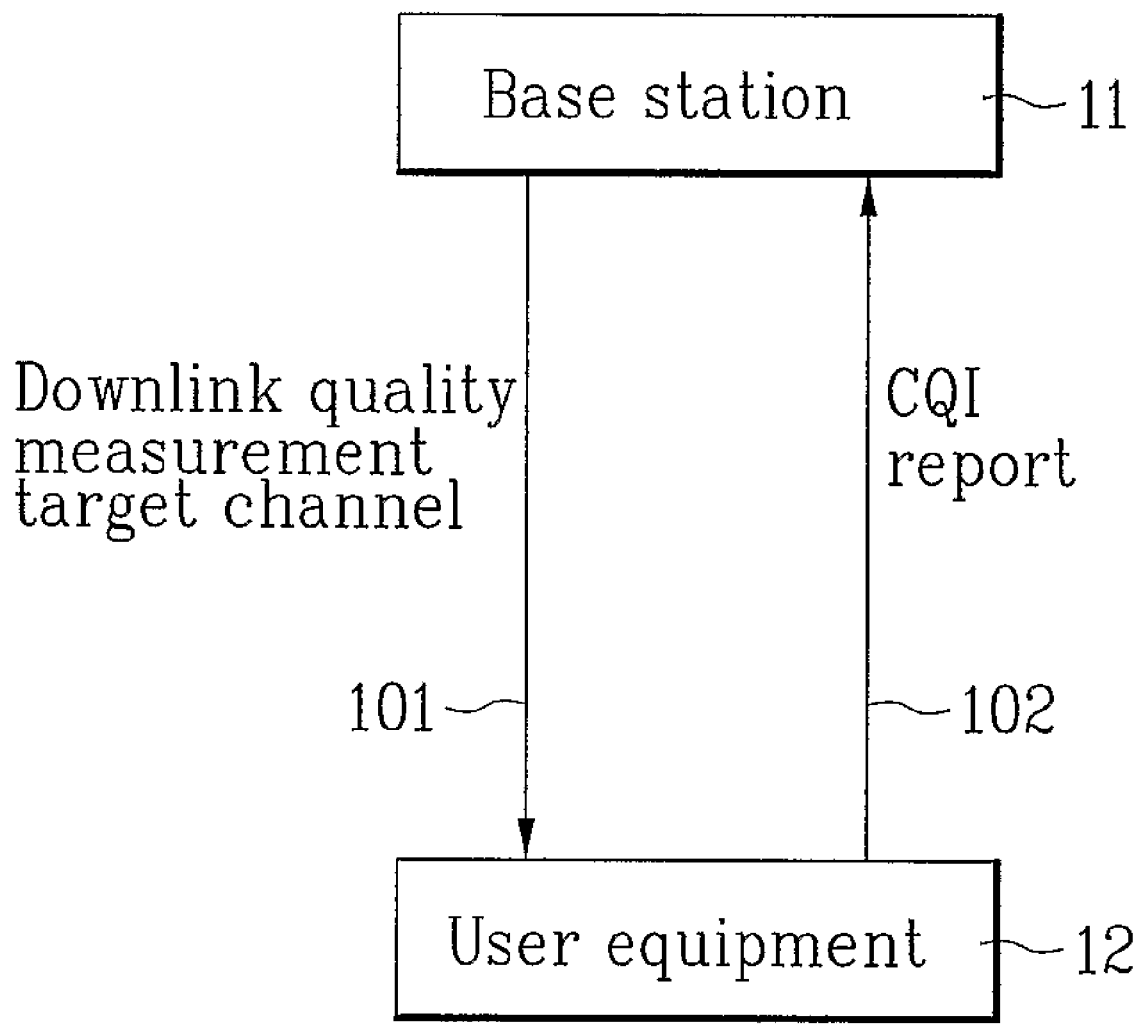
FIG. 1 is an explanatory view illustrating a method of measuring and transmitting channel quality information in a mobile communication system.
Figure 2:
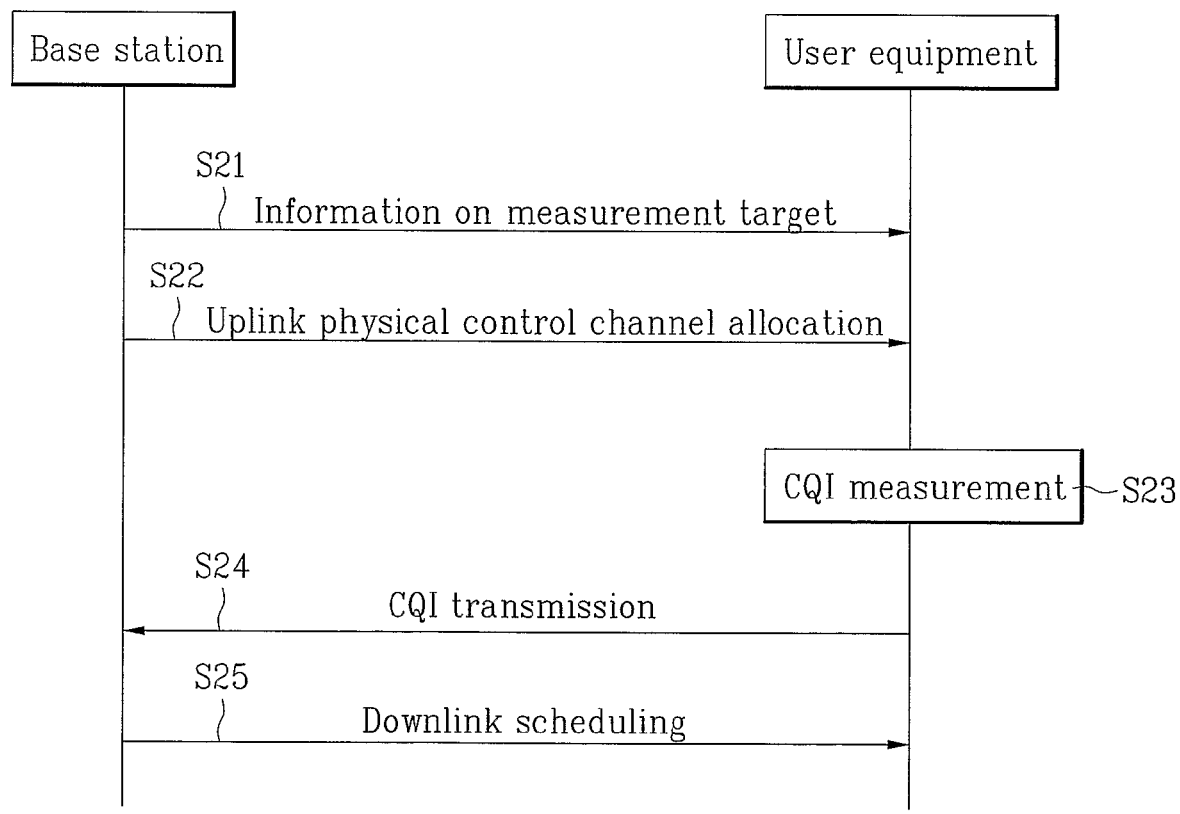
FIG. 2 is an explanatory view illustrating a method of transmitting CQI using a physical layer channel.

FIG. 2 is an explanatory view illustrating a method of transmitting CQI using a physical channel. Hereinafter, a method of transmitting CQI through a CQICH which is an example of a physical channel will be described. As shown in FIG. 2, a base station transmits information of a measurement target to a user equipment (S21). In other words, the information of the measurement target is a position on a time and/or frequency region, and is previously designated. Alternatively, if a measurement area is not previously designated, the base station notifies the user equipment of a measurement target region to which a pilot (reference signal) is transmitted to perform downlink measurement. The measurement region means a time-frequency region comprised of resource sections (RB) for pilot transmission.

Meanwhile, in order to measure downlink quality, all the user equipments may measure a channel using a common pilot (for example, preamble, reference pilot, and reference signal, etc) either by designating a specific measurement region as above or without designating a specific measurement region.

In case that a multi-antenna is used, a method of additionally providing a pilot signal (or reference signal) (for multi-input multi-output (MIMO)) in addition to a common pilot and reporting the additional pilot signal to the user equipment can be selected. In the case that a multi-antenna is used, a channel status depends on each antenna. Accordingly, since channel estimation is required for each antenna, a private pilot is required. In this case, the base station should designate for the user equipment as to which pilot should be measured. To this end, a method of previously designating a position and a method of transmitting position information and a corresponding pilot if necessary can be used.

The base station allocates a physical layer control channel for CQI report to the user equipment (S22), and the user equipment measures signals transmitted through the measurement target region to acquire CQI information (S23). The user equipment transmits the acquired CQI information through the allocated physical layer control channel (S24).

Embodiments of a method of transmitting CQI through the physical layer control channel will be described below.

As a first embodiment, an average value of the whole CQI band can be transmitted to a physical layer. In this case, an identifier of each CQI band is not required. Also, a method of reporting a CQI value of the whole CQI band non-periodically may additionally be provided. However, if CQI information increases greatly, it is difficult to actively adapt to such increase of CQI information due to a limited resource of a physical channel.

As a second embodiment, differential modulation (DM) information between an average value of the whole CQI band and a previous average value is transmitted. In this case, to adapt to an error status of the DM information, it is necessary to periodically or non-periodically transmit average value information of the whole CQI band or whole information which is not averaged.

As a third embodiment, all of individual values of the whole CQI band can be transmitted. In this case, channel information can be transmitted exactly but physical channel control information to be transmitted may increase greatly.

As a fourth embodiment, CQI values of several (N) CQI bands having excellent channel status (or having both excellent channel status and poor channel status) are transmitted to a physical channel. In this case, an identifier of the selected CQI band should be transmitted.

As a fifth embodiment, DM information of CQI values of several (N) CQI bands having excellent channel status (or having both excellent channel status and poor channel status) can be transmitted. In this case, it is necessary to periodically or non-periodically transmit individual CQI values of the CQI bands.

As a sixth embodiment, a CQI value corresponding to a single CQI band is transmitted at once. In this case, time latency may occur in transmitting channel information of the whole CQI bands. The CQI bands are sequentially selected, and it may be necessary to periodically or non-periodically transmit whole channel information.

A seventh embodiment is the same as the sixth embodiment except that DM information only is transmitted. In this case, it is necessary to transmit whole channel information occasionally.

As an eighth embodiment, a single CQI band value is only transmitted at once. In this case, the CQI band having the most excellent channel quality or the worst channel quality can be selected.

A ninth embodiment is the same as the fourth embodiment except that selected N average CQI values can be transmitted.

If the CQI is transmitted to the base station in accordance with the aforementioned embodiments, the base station performs downlink scheduling using the received CQI (S25).

Figure 3:
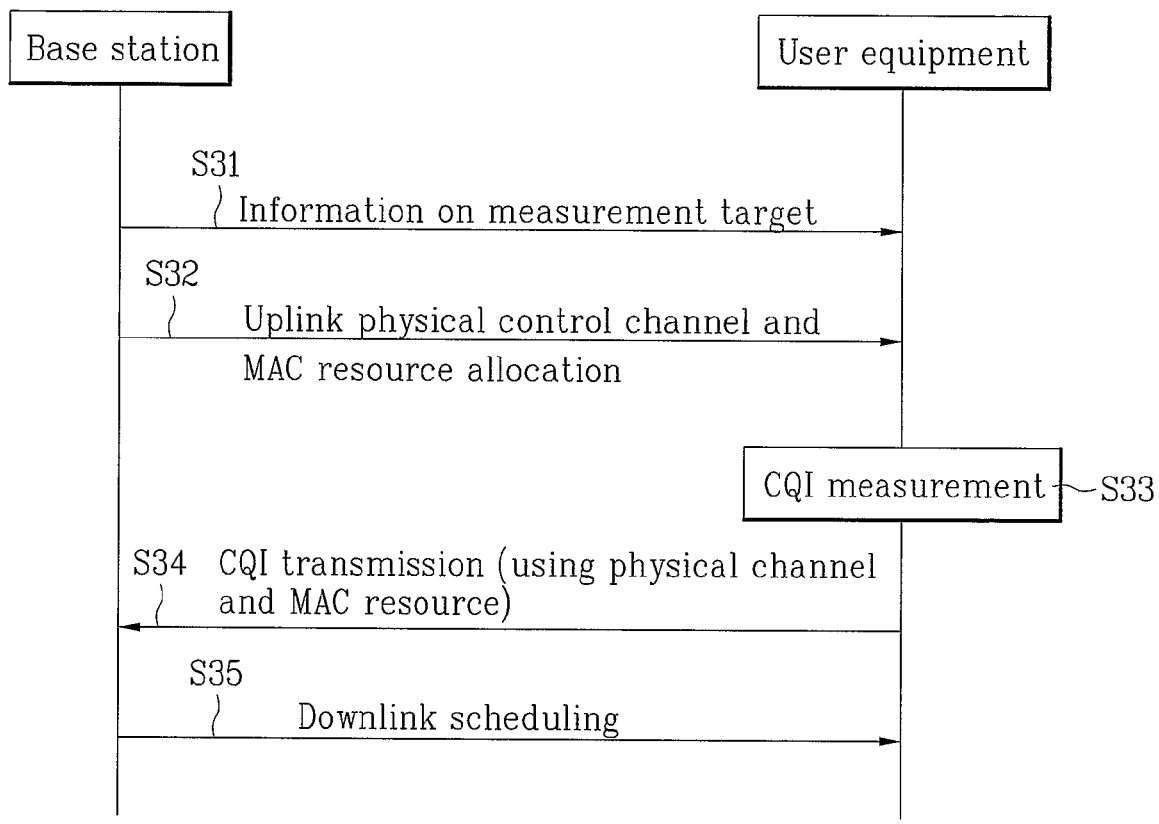
FIG. 3 is an explanatory view illustrating a method of transmitting CQI using a physical layer channel and medium access control (MAC) signaling.

FIG. 3 is an explanatory view illustrating a method of transmitting CQI using a physical channel and MAC signaling. Hereinafter, a method of transmitting CQI information through CQICH which is an example of the physical channel will be described. As shown in FIG. 3, the base station transmits information of a measurement target to the user equipment (S31). In other words, the information of the measurement target is a position on a time and/or frequency region, and is previously designated. Alternatively, when a measurement region is not previously designated, the base station notifies the user equipment of a measurement target region to which a pilot (reference signal) is transmitted to perform downlink measurement. The measurement region means a time-frequency region comprised of resource blocks (RB) for pilot transmission.

Meanwhile, in order to measure downlink quality, all the user equipments may measure a channel using a common pilot (for example, preamble and reference pilot) either by designating a specific measurement region as above or without designating a specific measurement region.

In case that a multi-antenna is used, a method of additionally providing a pilot signal (for MIMO) in addition to a common pilot and reporting the additional pilot signal to the user equipment can be selected. In case that the multi-antenna is used, a channel status depends on each antenna. Accordingly, since channel estimation is required for each antenna, a private pilot is required. In this case, the base station should designate for the user equipment as to which pilot should be measured. To this end, a method of previously designating a position and a method of transmitting position information and a corresponding pilot if necessary can be used.

The base station allocates a physical layer control channel for CQI report to the user equipment, and also allocates a MAC resource to the user equipment if it is necessary to transmit MAC signaling information (S32). The user equipment measures signals transmitted through the measurement target region to acquire CQI information (S33). Also, the user equipment transmits the acquired CQI information through the allocated physical layer control channel and/or MAC signaling (S34). The user equipment checks the result of uplink MAC scheduling, and transmits channel quality information using the physical control channel and MAC signaling if an uplink MAC resource has been scheduled. Meanwhile, if the uplink MAC resource has not been scheduled, the user equipment transmits channel quality information using the physical control channel only.

Embodiments of a method of transmitting CQI through the physical layer control channel and MAC signaling will be described below.

As a first embodiment, CQI values of selected N CQI bands are transmitted to the physical channel. In this case, the CQI bands are selected based on channel quality status, for example. Identity information like an identifier of the selected CQI bands is also transmitted to the physical channel. Meanwhile, the CQI values of the whole CQI bands may be transmitted through MAC signaling.

A second embodiment is similar to the first embodiment except that CQI values corresponding to some of the CQI bands are transmitted to MAC signaling.

As a third embodiment, differential modulation (DM) information of CQI values corresponding to N number of selected CQI bands is transmitted to the physical channel. At this time, identifiers of the selected CQI bands are also transmitted to the physical channel. CQI values of the whole CQI bands are transmitted using non-periodical MAC signaling.

A fourth embodiment is the same as the third embodiment except that DM information of CQI values of partially selected CQI bands not the whole CQI bands is transmitted to MAC signaling.

As a fifth embodiment, CQI values of N number of selected CQI bands are transmitted to the physical channel. In this case, identification (ID) information of the selected CQI bands is transmitted to MAC signaling not the physical channel. Accordingly, the ID information should be synchronized with physical channel information during demodulation. Also, it is necessary to non-periodically transmit CQI values of the whole CQI bands.

As a sixth embodiment, DM information of CQI values corresponding to N number of selected CQI bands is transmitted to the physical channel. At this time, ID information of the selected CQI bands is transmitted to MAC signaling.

Also, CQI values of the whole CQI bands are transmitted to MAC signaling non-periodically.

A seventh embodiment is similar to the sixth embodiment except that ID of selected CQI bands and CQI values of the selected CQI bands are transmitted to MAC signaling. However, a problem occurs in that the CQI bands selected in the physical channel are not synchronized with the CQI values of the selected CQI bands transmitted to MAC signaling.

As an eighth embodiment, CQI values of the whole CQI bands are transmitted to both the physical channel and MAC signaling. In this case, the physical channel is periodical information, and MAC signaling is non-periodical information.

As a ninth embodiment, DM information of CQI values of the whole CQI bands is transmitted to the physical channel while CQI values of the whole CQI bands are transmitted to MAC signaling non-periodically.

As a tenth embodiment, a CQI value of a single CQI band is transmitted to the physical channel at once. Then, CQI values of the next CQI bands are sequentially transmitted to the physical channel. CQI values of the whole CQI bands are transmitted to MAC signaling periodically or non-periodically.

An eleventh embodiment is similar to the tenth embodiment except that a CQI value transmitted to the physical channel is DM information.

As a twelfth embodiment, a CQI band having excellent quality is selected and transmitted to the physical channel at once. At this time, ID of the selected CQI band is also transmitted to the physical channel. CQI values of the whole CQI bands are transmitted to MAC signaling periodically or non-periodically.

A thirteenth embodiment is similar to the twelfth embodiment except that ID information of a selected CQI band is transmitted to MAC signaling. At this time, the ID information should be synchronized with physical channel information.

A fourteenth embodiment is similar to the first embodiment except that an average value of selected CQI bands is transmitted to the physical channel.

A fifteenth embodiment is similar to the fifth embodiment except that an average value of selected CQI bands is transmitted to the physical channel.

If the CQI is transmitted to the base station in accordance with the aforementioned embodiments, the base station performs downlink scheduling using the received CQI (S35).

Figure 4:
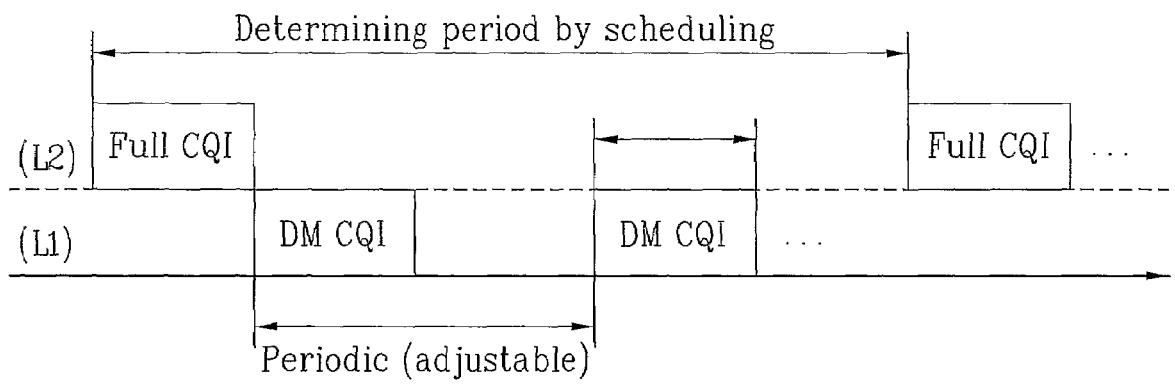
FIG. 4 is an explanatory view illustrating a method of transmitting differential modulation (DM) information to a physical channel and CQI of a whole CQI band to MAC signaling in accordance with the embodiments of FIG. 3.

FIG. 4 is an explanatory view illustrating a method of transmitting DM information to the physical channel and CQI of whole CQI bands to MAC signaling in accordance with the embodiments of FIG. 3. As shown in FIG. 4, the user equipment may transmit CQI information (full CQI) corresponding to all the CQI bands to the base station by using MAC signaling. Meanwhile, the user equipment may transmit a reference CQI value for CQI variation information according to DM by using the MAC signaling. Also, the user equipment may transmit CQI variation information (DM CQI) through a physical channel (for example, CQICH) based on the reference CQI value.

At this time, information transmitted from the user equipment through MAC signaling may be transmitted at a time determined by a scheduler of the base station. Alternatively, the information may be transmitted periodically or if a specific event occurs. Meanwhile, the DM information is transmitted periodically through the physical channel by using a single sub-frame. At this time, a transmission period of the DM information can be controlled.

As described above, CQI which is periodical and requires quick response can be transmitted to the physical layer, and information which is non-periodical and has high rate can be transmitted using MAC signaling. Also, DM can be used to minimize an information rate of the physical layer. In this way, exact channel quality information which can quickly adapt to channel change can be transmitted, and the rate of the information transmitted to the physical layer can be minimized.

Figure 5:
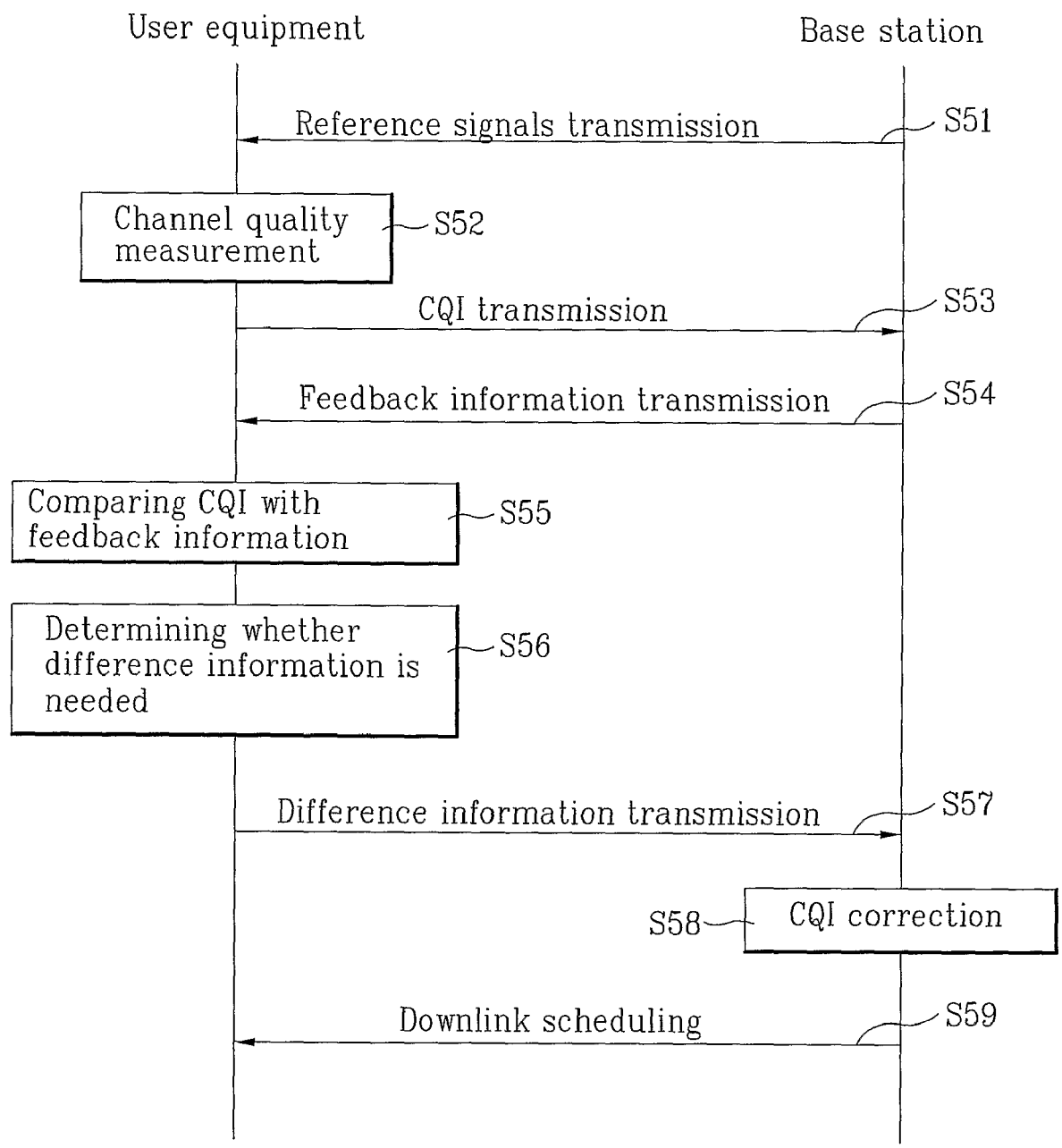
FIG. 5 is a flow chart illustrating a preferred embodiment of the present invention.

FIG. 5 is a flow chart illustrating a preferred embodiment of the present invention. Referring to FIG. 5, the base station transmits reference signals to the user equipment during call establishment or data transmission after call establishment (S51). The user equipment measures quality of a downlink channel by using the reference signals received from the base station (S52). The reference signals mean signals transmitted through a pilot channel in a CDMA system, a preamble or midamble signal in an orthogonal frequency division multiplexing (OFDM) or orthogonal frequency division multiple access (OFDMA) system, or signals such as pilot signals, which both the base station and the user equipment know. The user equipment can measure quality of the downlink channel by identifying a variation range of the reference signal. Meanwhile, the user equipment divides a frequency band allocated thereto into a plurality of sections to measure channel quality per section. Hereinafter, 'section' will be used to mean 'CQI band' because it means a unit band for measuring channel quality.

The user equipment transmits channel quality information to the base station after measuring quality of the downlink channel (S53). A channel quality indicator (CQI) has been used as the channel quality information in the embodiment of FIG. 5. CINR, BER, FER, and the like may be used as the channel quality information. CQI means an indicator which indicates each rank when quality of the channel is subdivided for each rank. For example, when quality of the channel is subdivided into 32 ranks, each rank can be identified by CQI of 5 bits. In case that the frequency band allocated to the user equipment is divided into a plurality of sections (CQI bands) to measure channel quality, the user equipment transmits CQI for each section to the base station. A detailed method of transmitting CQI from the user equipment to the base station may depend on a detailed method of transmitting channel quality information.

The base station transmits feedback information of CQI received from the user equipment to the user equipment (S54). The feedback information may have various types using CQI received from the user equipment. For example, the base station may transmit CQI received from the user equipment as the feedback information. For another example, the base station may receive CQI of some band from the user equipment to estimate channel quality information of the whole bands and transmit the estimated channel quality information of the whole bands.

The base station may transmit the feedback information to the user equipment periodically or non-periodically. Alternatively, the base station may transmit the feedback information to the user equipment if a predetermined event occurs or if there is a request from the user equipment. If the base station transmits the feedback information to the user equipment periodically, it is preferable to transmit the feedback information through the control channel. If the base station transmits the feedback information to the user equipment non-periodically, it is preferable to transmit the feedback information through a traffic channel by using MAC signaling. The feedback information preferably undergoes channel encoding to allow the user equipment to detect and correct errors even if the errors occur during transmission of the feedback information.

Hereinafter, the steps S53 and S54 of FIG. 5 will be described with reference to a detailed example. According to the example described below, the frequency band is divided into 12 sections (CQI bands) and each section is divided into 32 modulation and coding set (MCS) levels so that CQI is transmitted in a differential modulation (DM) mode.

Table 1 illustrates a method of measuring downlink channel quality at a time period of t=1 and calculating DM CQI information to be transmitted to the base station.

TABLE 1

| | Section | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Full CQI (t = 0) | 11 | 10 | 9 | 6 | 5 | 7 | 9 | 13 | 10 | 7 | 4 | 2 |
| Full CQI (t = 1) | 12 | 11 | 10 | 5 | 4 | 6 | 10 | 14 | 9 | 6 | 3 | 1 |
| DM CQI (t = 1) | 1 | 1 | 1 | −1 | −1 | −1 | 1 | 1 | −1 | −1 | −1 | −1 |

In Table 1, 'section' means each CQI band when the whole frequency band is divided into 12 CQI bands. 'Full CQI (t=0)' is CQI per section, which is measured by the user equipment at a time period of t=0, and 'Full CQI (t=1)' is CQI per section, which is measured by the user equipment at a time period of t=1. 'DM CQI' means differential information of 'Full CQI (t=0)' and 'Full CQI (t=1)' per section, and is CQI information transmitted from the user equipment to the base station at a time period of t=1.

Table 2 illustrates a method of calculating feedback information to be transmitted from the base station to the user equipment at a time period of t=2.

TABLE 2

| | Section | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| DM CQI (t = 2) | 1 | 1 | 1 | −1 | −1 | −1 | 1 | 1 | −1 | −1 | 1 | 1 |
| Full CQI (t = 1) | 11 | 10 | 9 | 6 | 5 | 7 | 9 | 13 | 10 | 7 | 4 | 2 |
| Full CQI (t = 2) | 12 | 11 | 10 | 5 | 4 | 6 | 10 | 14 | 9 | 6 | 5 | 3 |

In Table 2, 'DM CQI (t=2)' is DM CQI per section, which is transmitted from the user equipment at a time period of t=1 and received by the base station at a time period of t=2. According to the example of Table 2, errors occur in the eleventh section and the twelfth section during transmission. 'Full CQI (t=1)' is CQI per section, which is known by the base station up to a time period of t=2, and it is supposed that no error occurs up to the time period of t=2. 'Full CQI (t=2)' is CQI per section at a time period of t=2, which is calculated from 'DM CQI (t=2)' and 'Full CQI (t=1)' by the base station, and is feedback information transmitted from the base station to the user equipment. At this time, the base station can transmit 'DM CQI (t=2)' received from the user equipment to the user equipment as feedback information.

The user equipment compares the feedback information received from the base station with the CQI information stored therein (S55). Table 3 illustrates a comparison result per section at a time period of t=3 supposing that the user equipment has received the feedback information without error.

TABLE 3

| | Section | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Full CQI (t = 1) | 12 | 11 | 10 | 5 | 4 | 6 | 10 | 14 | 9 | 6 | 3 | 1 |
| Full CQI (t = 3) | 12 | 11 | 10 | 5 | 4 | 6 | 10 | 14 | 9 | 6 | 5 | 3 |
| Δ | 0 | 0 | 0 | 0 | 0 | 0 | 0 | 0 | 0 | 0 | −2 | −2 |

In Table 3, 'Full CQI (t=1)' is CQI per section, which is known by the user equipment, and 'Full CQI (t=3)' is feedback information received from the base station at a time period of t=3. 'Δ' represents an error between 'Full CQI (t=1)' and 'Full CQI (t=3).' Since it has been supposed that errors occur in the eleventh section and the twelfth section in Table 2, errors occur in the eleventh section and the twelfth section even if the user equipment compares the feedback information received from the base station with the CQI information stored therein.

After the user equipment compares the feedback information received from the base station with the CQI information stored therein, if predetermined conditions are satisfied, the user equipment determines whether it needs to transmit error information for matching CQI information received by the base station with CQI information transmitted by the user equipment (S56). The predetermined conditions for determining whether the user equipment needs to transmit the error information are as follows.

First, if errors occur in sections which exceed a first threshold value, i.e., if the number of sections where 'Δ' is not zero '0' exceeds the first threshold value in Table 3, it is possible to determine that the user equipment needs to transmit the error information. The first threshold value may be a value more than 1.

Second, it is determined that errors occur in corresponding sections if an absolute value of 'Δ' is greater than a second threshold value K. Thus, it is possible to determine that the user equipment needs to transmit the difference information of the corresponding sections or the whole sections.

Third, if CQI bands where the absolute value of 'Δ' is greater than the second threshold value K, among whole N sections, i.e., N CQI bands, exceed a third threshold value, it is possible to determine that the user equipment needs to transmit the difference information.

Fourth, if an average value of errors of the whole N CQI bands exceeds a fourth threshold value Y, it is possible to determine that the user equipment needs to transmit the difference information.

Finally, if an average value of CQI bands where errors occur, among whole N CQI bands, exceeds a fourth threshold value Z, it is possible to determine that the user equipment needs to transmit the difference information.

The aforementioned conditions for determining whether the user equipment needs to transmit the difference information and the first to fourth threshold values according to each condition can be transmitted to the user equipment during transmission of the feedback information or signaling for call establishment. As another method, it is possible to set the aforementioned conditions and the resultant threshold values through prior consent between the base station and the user equipment. As other method, it is possible to notify the base station of the aforementioned conditions and the resultant threshold values when the user equipment determines by itself whether to transmit the difference information and transmits the difference information.

Referring to again FIG. 5, in case that the user equipment determines that it needs to transmit the difference information, the user equipment transmits the difference information to the base station (S57). The user equipment can transmit some of the CQI information or the whole CQI information as the difference information. In case that the user equipment transmits some of the CQI information, the user equipment can transmit either 'Full CQI' value of the CQI band where errors occur or the 'Δ' value. In the case that the user equipment transmits the whole CQI information, the user equipment can transmit either 'Full CQI' value of the whole CQI bands including the CQI band where errors occur or the 'Δ' value.

The user equipment can transmit the difference information to the base station in a contention-based transmission mode or a scheduled transmission mode. The contention-based transmission mode is referred to as non-scheduled or autonomous transmission mode, and is to transmit the difference information through a contention-based channel previously allocated by the base station without requesting separate channel allocation for transmission of the difference information. According to the scheduled transmission mode, the user equipment requests channel allocation of the base station so as to transmit the difference information, and then transmits the difference information through the channel allocated from the base station.

The base station receives the difference information from the user equipment and corrects CQI information of the CQI band having errors, by using the received error information (S58). The base station performs downlink scheduling using the corrected CQI information (S59).

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method of transmitting channel quality information in a mobile communication system and a support method thereof according to the present invention have the following advantages.

First, it is possible to correct errors occurring when the user equipment transmits downlink channel quality information to the base station.

In addition, since the base station performs downlink scheduling by using exact channel quality information, it is possible to efficiently distribute a limited radio resource, thereby improving throughput of the whole system.

The invention claimed is:

1. A method of transmitting channel quality information (CQI) in a system which transmits data by using multi-carriers, the method comprising:
    transmitting CQI corresponding to a plurality of CQI bands constituting a whole frequency band, the CQI including first information having a size more than a certain size through medium access control (MAC) signaling; and
    transmitting CQI corresponding to the CQI bands, the CQI including second information having a size less than the certain size on a physical channel.

2. The method as claimed in claim 1, wherein the first information is CQI of all the CQI bands.

3. The method as claimed in claim 2, wherein the second information is differential modulation (DM) information corresponding to each of the CQI bands.

4. The method as claimed in claim 3, wherein reference value information for differential modulation is transmitted through MAC signaling.

5. The method as claimed in claim 1, wherein the transmission of the second information through the physical channel is performed periodically.

6. The method as claimed in claim 5, wherein the transmission period of the second information is adjustable.

7. The method as claimed in claim 1, wherein the transmission of the first information through the MAC signaling is performed periodically.

8. The method as claimed in claim 1, wherein the transmission of the first information through the MAC signaling is controlled by a scheduler of the base station.

9. The method as claimed in claim 1, wherein the transmission of the first information through the MAC signaling is performed if a specific event occurs.

10. The method as claimed in claim 1, wherein downlink scheduling is performed using the first information and the second information.

11. A method of transmitting channel quality information from a user equipment to a base station in a mobile communication system, the method comprising:
    transmitting channel quality information which is measured based on signals received from the base station, to the base station;
    receiving feedback information of the channel quality information from the base station; and
    transmitting difference information to the base station, the difference information being necessary for matching the channel quality information transmitted by the user equipment with channel quality information received by the base station based on the feedback information.

12. The method as claimed in claim 11, wherein the user equipment transmits the difference information to the base station if a comparison result between the channel quality information transmitted from the user equipment and the feedback information satisfies certain conditions.

13. The method as claimed in claim 12, further comprising receiving a parameter from the base station, which determines whether the certain conditions are satisfied.

14. The method as claimed in claim 13, wherein the parameter is received along with the feedback information.

15. The method as claimed in claim 13, wherein the parameter is received during call establishment between the base station and the user equipment.

16. The method as claimed in claim 11, wherein the feedback information is received periodically or non-periodically.

17. The method as claimed in claim 16, wherein the feedback information is received through a control channel if it is received periodically.

18. The method as claimed in claim 16, wherein the feedback information is received through a data channel if it is received non-periodically.

19. The method as claimed in claim 11, wherein the difference information is transmitted in a contention-based mode.

20. The method as claimed in claim 11, wherein the difference information is transmitted in a scheduled transmission mode.

21. A method of supporting transmission of channel quality information in a mobile communication system, the method comprising:
- receiving channel quality information from the user equipment, the channel quality information being measured by a user equipment based on signals transmitted from a base station; and
- transmitting feedback information to the user equipment to compare the received channel quality information with channel quality information transmitted by the user equipment.

22. The method as claimed in claim 21, further comprising receiving difference information from the user equipment to match the received channel quality information with the channel quality information transmitted by the user equipment.

23. The method as claimed in claim 21, further comprising transmitting a parameter to the user equipment, which determines whether certain conditions for transmission of the difference information are satisfied.

24. The method as claimed in claim 23, wherein the parameter is transmitted along with the feedback information.

25. The method as claimed in claim 23, wherein the parameter is transmitted during call establishment between the base station and the user equipment.

26. The method as claimed in claim 23, wherein the feedback information is received periodically or non-periodically.

* * * * *